United States Patent
Weismann et al.

[11] Patent Number: 5,908,366
[45] Date of Patent: Jun. 1, 1999

[54] DRIVE TRAIN FOR A VEHICLE

[76] Inventors: Christopher A. Weismann, 2371 Orange Ave., Unit B; Patrick L. Weismann, 2371 Orange Ave., Unit A, both of Costa Mesa, Calif. 92627; Peter H. Weismann, deceased, late of Santa Ana, Calif.; by Michele R. Weismann, executrix, 1631 Indus St., Santa Ana, Calif. 92707

[21] Appl. No.: 08/777,013

[22] Filed: Jan. 6, 1997

[51] Int. Cl.⁶ .................................................. F16H 37/08
[52] U.S. Cl. .......................... 475/202; 180/248; 475/200
[58] Field of Search .................................. 475/200, 202, 475/206; 74/745; 180/248

[56] References Cited

U.S. PATENT DOCUMENTS

| | | | |
|---|---|---|---|
| 2,223,522 | 12/1940 | Kysor | 74/745 |
| 2,536,737 | 1/1951 | Gerst | 74/745 |
| 2,865,228 | 12/1958 | Weismann | 74/650 |
| 3,282,366 | 11/1966 | Sprague | 180/248 |
| 3,283,611 | 11/1966 | Weismann et al. | 74/650 |
| 3,578,760 | 5/1971 | Shinmura | 475/200 |
| 4,736,809 | 4/1988 | Kumazawa | 74/745 |
| 5,131,285 | 7/1992 | Weismann et al. | 74/333 |
| 5,156,070 | 10/1992 | Fukuda et al. | 475/200 |
| 5,205,373 | 4/1993 | Kadokura et al. | 180/248 |
| 5,230,401 | 7/1993 | Kameda et al. | 180/248 |
| 5,257,675 | 11/1993 | Araki et al. | 475/200 |
| 5,301,565 | 4/1994 | Weismann et al. | 74/336 |
| 5,348,516 | 9/1994 | Shibata | 475/206 |
| 5,695,426 | 12/1997 | Lippitsch | 475/206 |
| 5,704,443 | 1/1998 | Janiszewski | 475/202 |

*Primary Examiner*—Dirk Wright
*Attorney, Agent, or Firm*—Lyon & Lyon LLP

[57] ABSTRACT

A drive train for a four wheel drive vehicle including an engine and a clutch directing power through a high/low transmission to a six speed transmission located adjacent to and parallel with the engine in an expanded engine sump case. A constant velocity joint is driven from one end of the transmission output shaft for driving a rear differential associated with an independent rear suspension. From the other end of the transmission output shaft, a fluid coupling is employed to selectively engage a front differential. The front differential drives gear wheels to engage back to back constant velocity joints which are located lower than the differential rotational axis to advantage the suspension configuration.

26 Claims, 8 Drawing Sheets

DRIVE TRAIN FOR A VEHICLE

BACKGROUND OF THE INVENTION

The field of the present invention is mechanisms for delivering power from an engine to propel a vehicle.

A wide variety of drive train configurations have been employed since the inception of motorized vehicles. Multi-axled drives have been used as well. Of late, drive trains capable of driving through all four wheels have attracted greater interest. This interest extends from off-road vehicles to race cars.

A conventional drive train for four-wheel drive vehicles includes an engine longitudinally mounted in the vehicle with a clutch/transmission assembly extending rearwardly from the engine. A short drive shaft is coupled between this assembly and a transfer case. The transfer case is typically mounted to the underside of the vehicle where it impacts on overall ground clearance. Such devices typically include a high/low transmission and a gear train for distributing power to the rear wheels on a constant basis and power to the front wheels on a selected basis. Differentials are then positioned front and rear to receive the power and distribute it to the wheels. Such systems lack versatility because of component length, required location of the transfer case, and the number of required components.

Advances in drive train components have made possible more usable four-wheel drive systems. The changing of operating modes on the fly in providing four-wheel drive automatically on demand are now becoming more universally available.

The drive components such as the high/low transmission gearing tend to be subjected to high torque loads because of location in the drive train. A lack of versatility of component height and ground clearance also exists because of necessary engine placement, component intrusion into the interior space of the vehicle, and efficient drive line considerations.

SUMMARY OF THE INVENTION

The present invention is directed to a drive train specifically configured for four-wheel drive vehicles.

In a first, separate aspect of the present invention, a drive train includes a high/low transmission located between the engine and the transmission while the transmission provides drive couplers at either end of the transmission output shaft. The location of the high/low transmission reduces the torque loading on these components. Multiple takeoffs from the transmission are also possible without duplicating the high/low system. This arrangement allows for the use of additional features such as an in-sump transmission, differentials driven by either end of the transmission output shaft and a combining of structures and components.

In a second, separate aspect of the present invention, a drive train includes a differential having differentially coupled drive gear wheels respectively coupling with two driven gear wheels which in turn drive rotatably mounted constant velocity joints arranged back to back. The use of the gear wheels makes possible a torque reduction load on the differential. The angular orientation of the constant velocity joints relative to the differential may also be varied to, for example, locate the half shafts and suspension below the drive train structure. Having the CV joints back to back increases the half shaft length.

In a third, separate aspect of the present invention, a driven train includes a transmission parallel and adjacent to the engine. Drive couplers are at each end of the output shaft of the transmission with a fluid coupling associated with one drive coupler. Differentials are arranged to be driven by one drive coupler through the fluid coupling and by the other drive coupler through a drive shaft, respectively. A versatile compact drive system can thereby be provided. The arrangement admits of placing the transmission in the sump. A compact unitary drive assembly for several of the components is also permitted.

In a fourth, separate aspect of the present invention, a drive train with a high/low transmission between the engine and the transmission includes two drive couplers associated with the ends of the transmission output shaft. A fluid coupling is driven by one of the drive couplers. The transmission is adjacent the engine. A structural drive unit is thus provided with outputs in two directions for association with differentials and the like.

In a fifth, separate aspect of the present invention, a drive train including an engine and a transmission with a high/low transmission therebetween is contained within the engine sump and a drive housing fixed to the engine block and engine sump. A first differential is also positioned in the drive housing. A rigid assembly is thus provided which includes a drive train comprising the engine through one differential. A further drive coupler will provide power to a remote differential.

Accordingly, it is an object of the present invention to provide an improved drive train for four-wheel drive vehicles and the like. Other and further objects and advantages will appear hereinafter.

DETAILED DESCRIPTION OF THE PREFERRED EMBODIMENT

Figure 1:
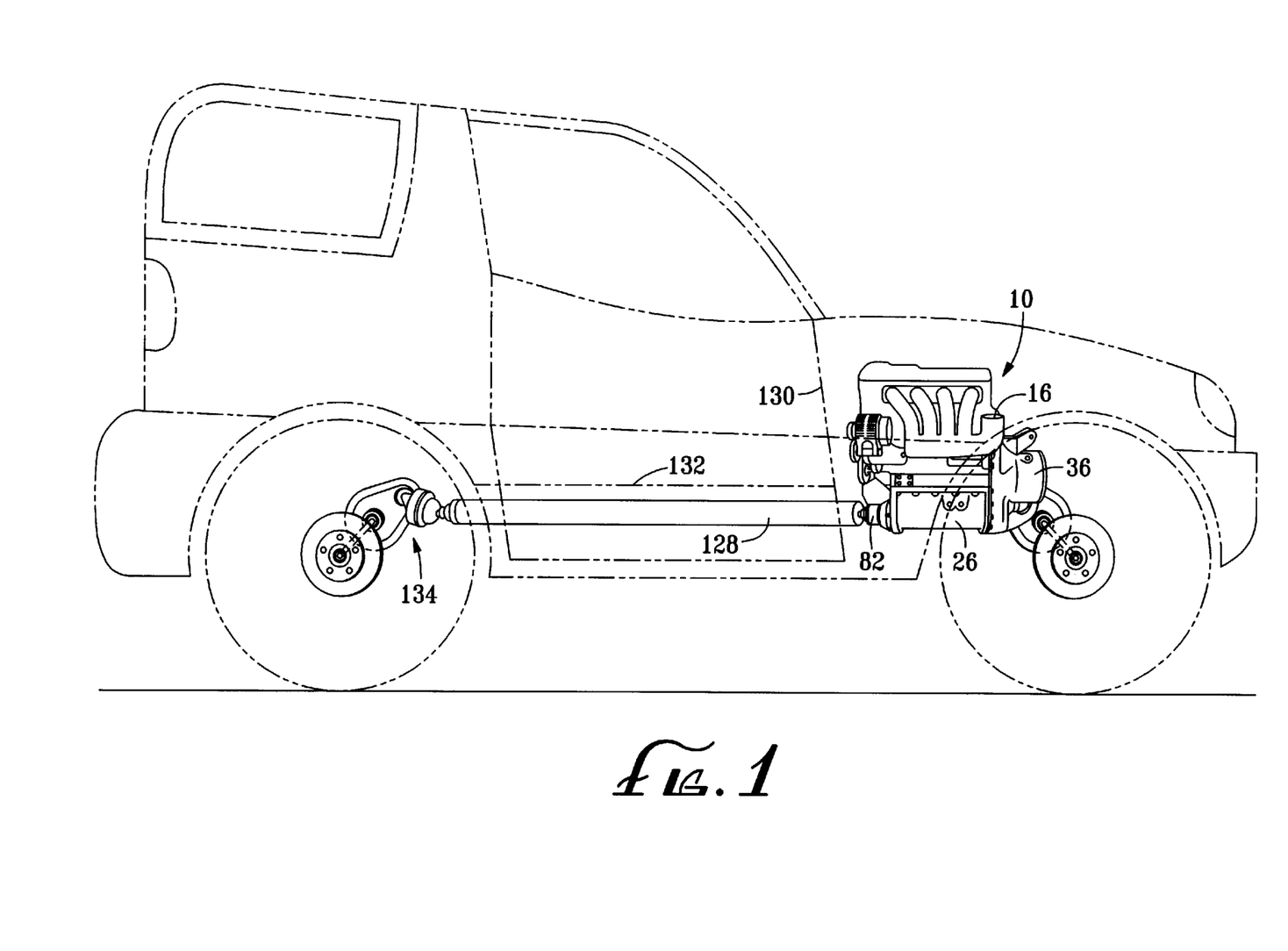
FIG. 1 is a right-side view of a vehicle showing the drive train.
Figure 2:
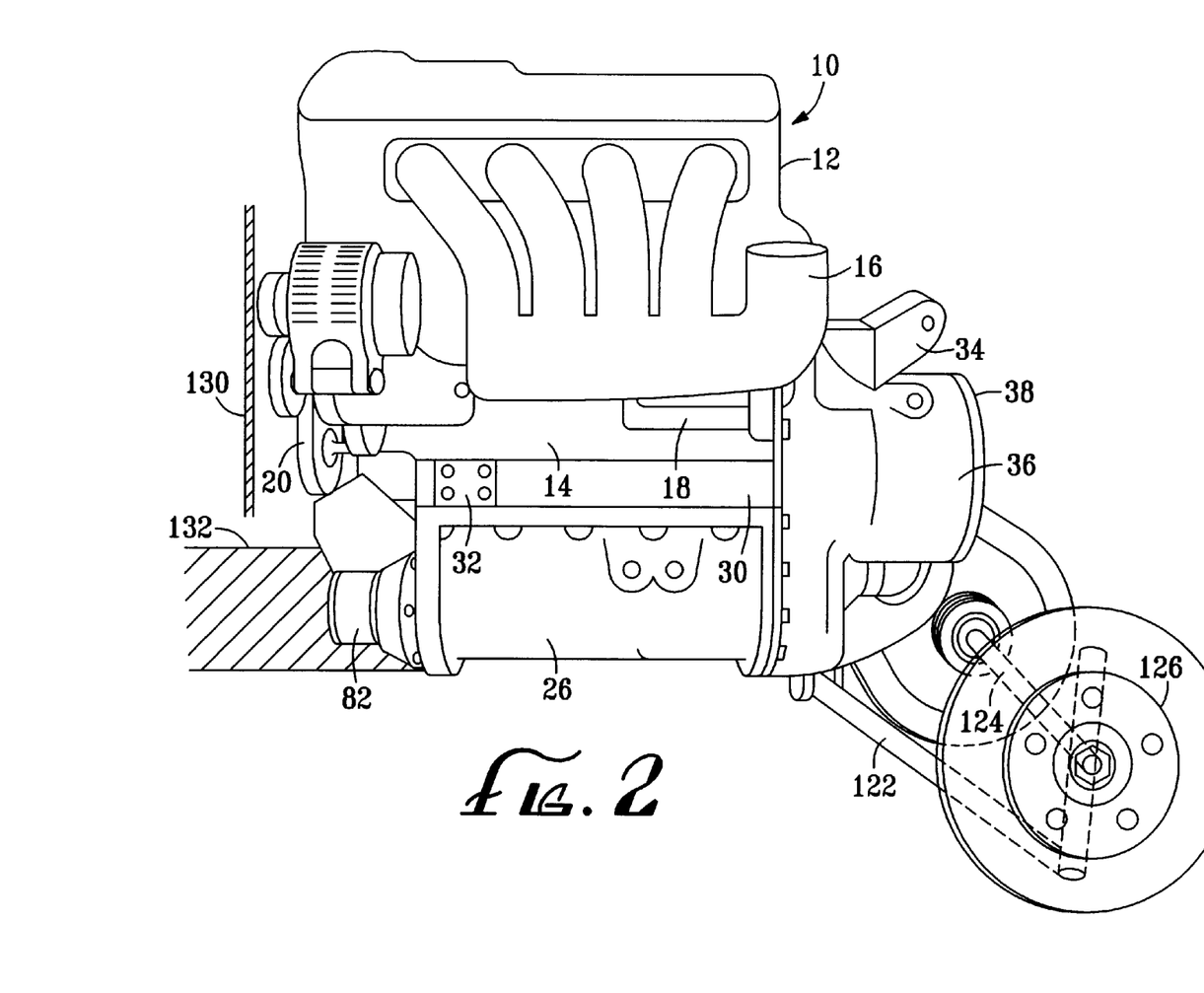
FIG. 2 is a right-side view of a drive train.
Figure 3:
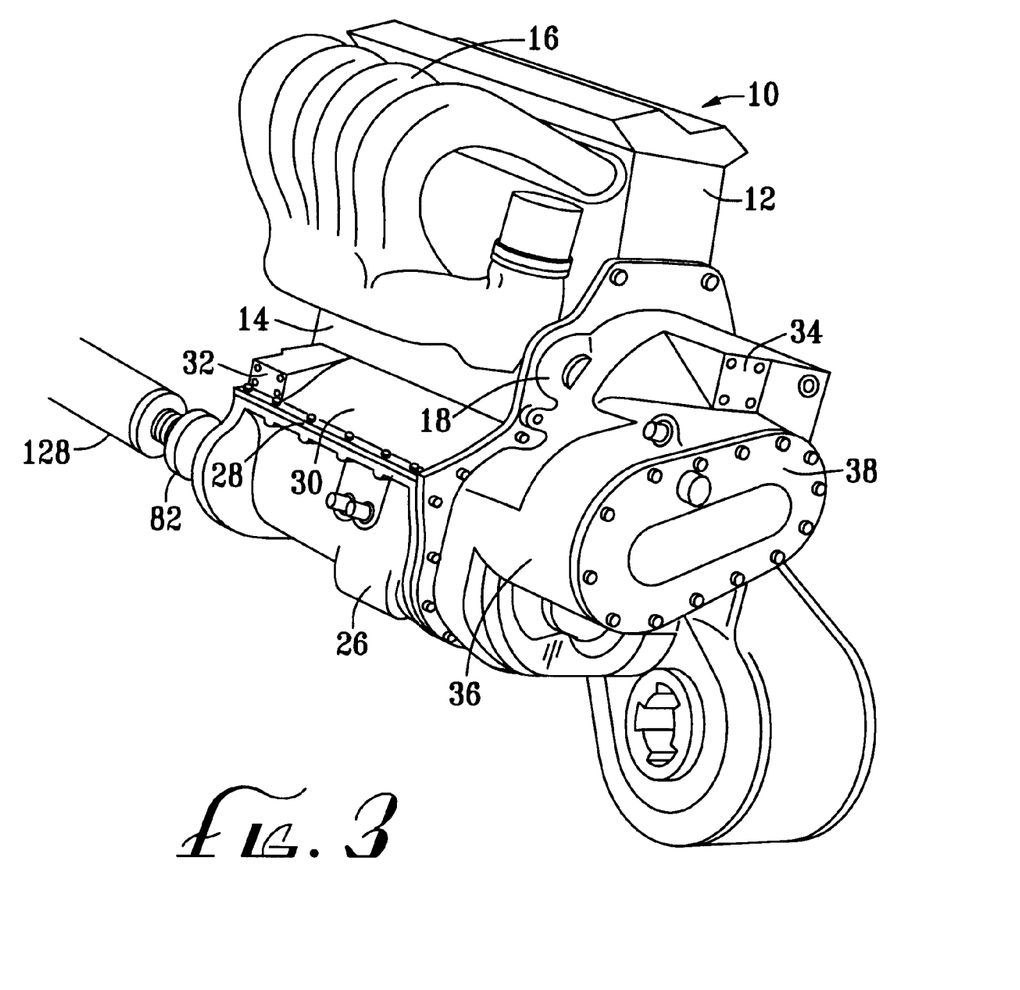
FIG. 3 is a perspective view of the drive train showing the front and right sides.
Figure 4:
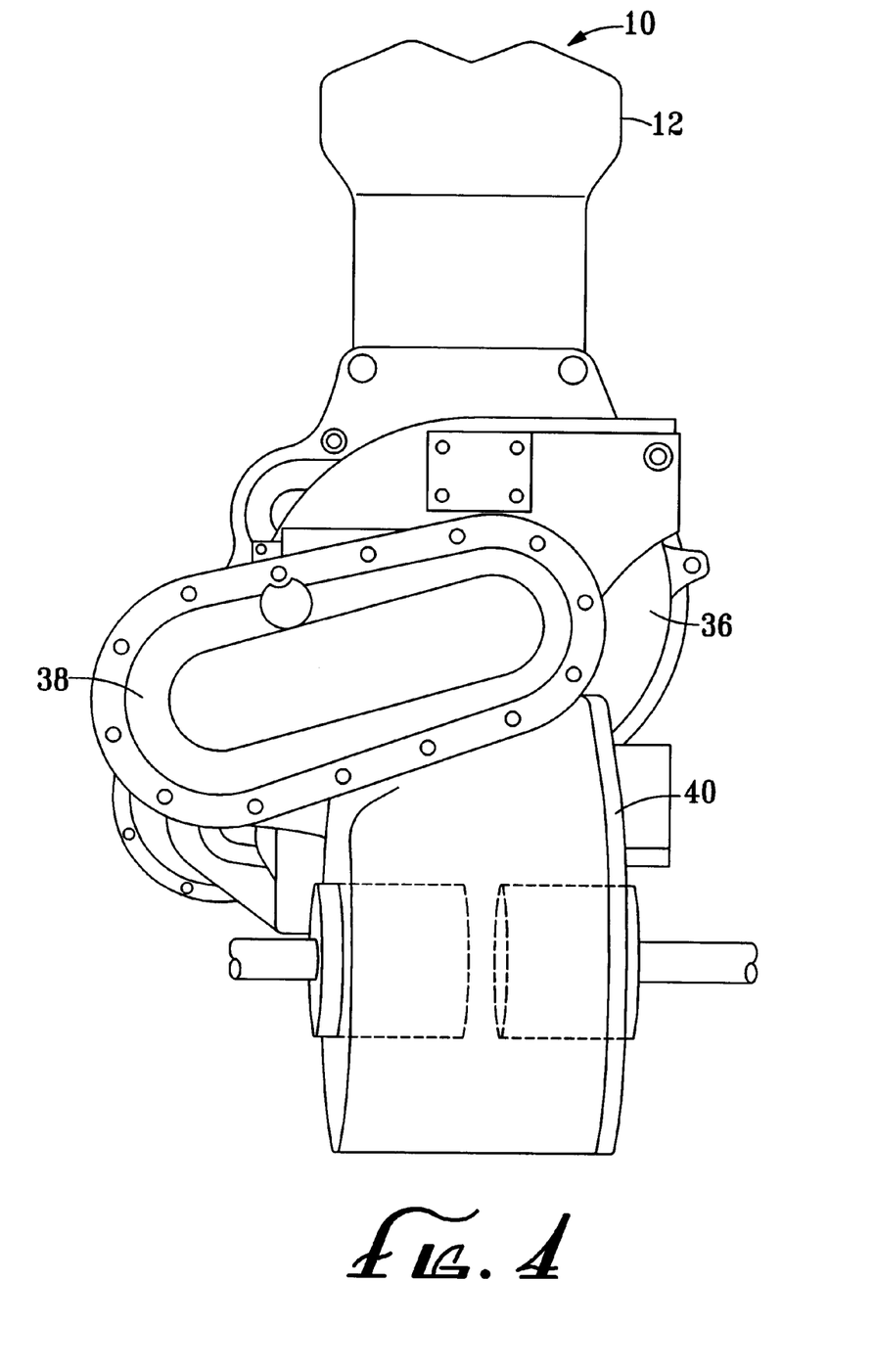
FIG. 4 is a front view of the drive train.
Figure 5:
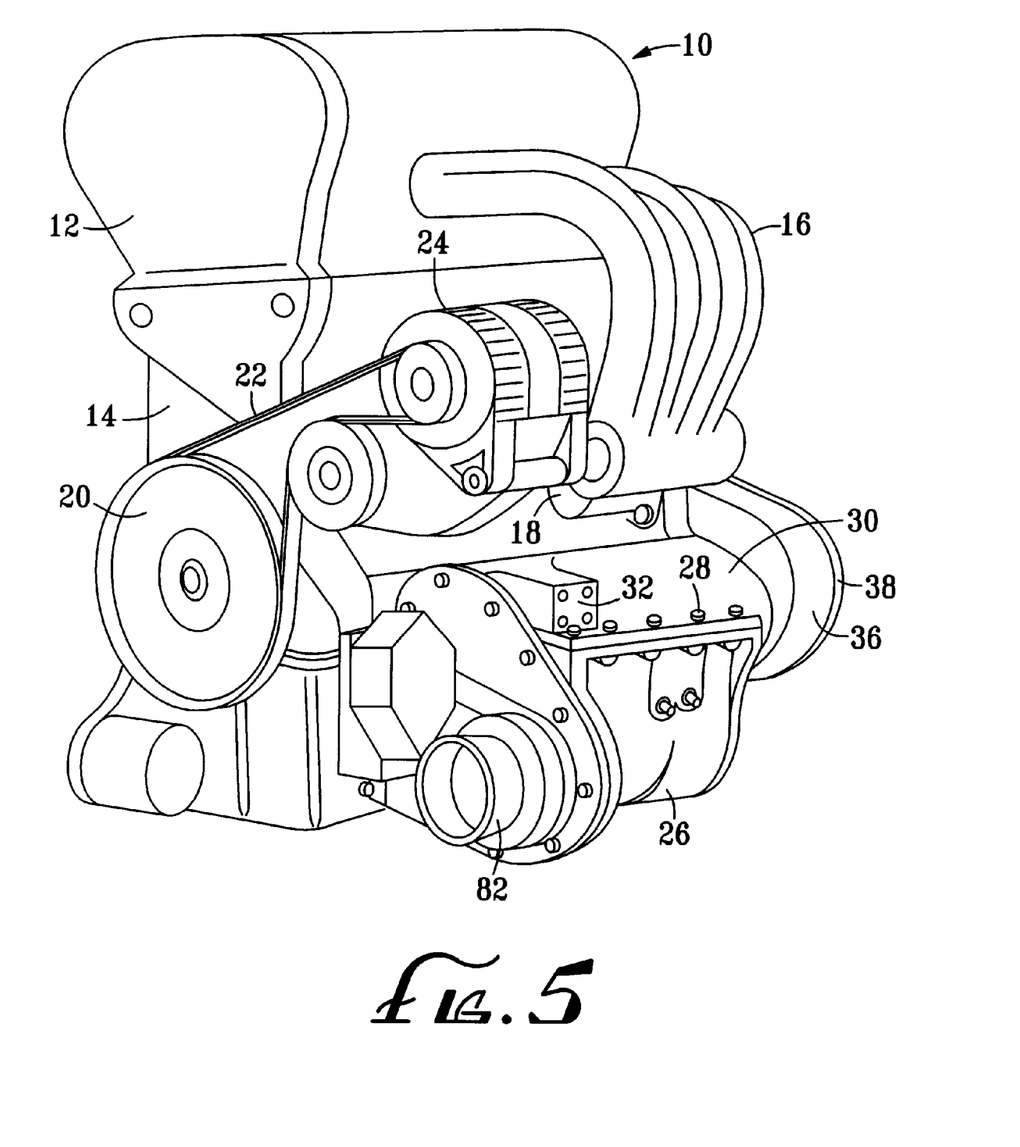
FIG. 5 is a perspective view showing the right and rear sides of the drive train.
Figure 6:
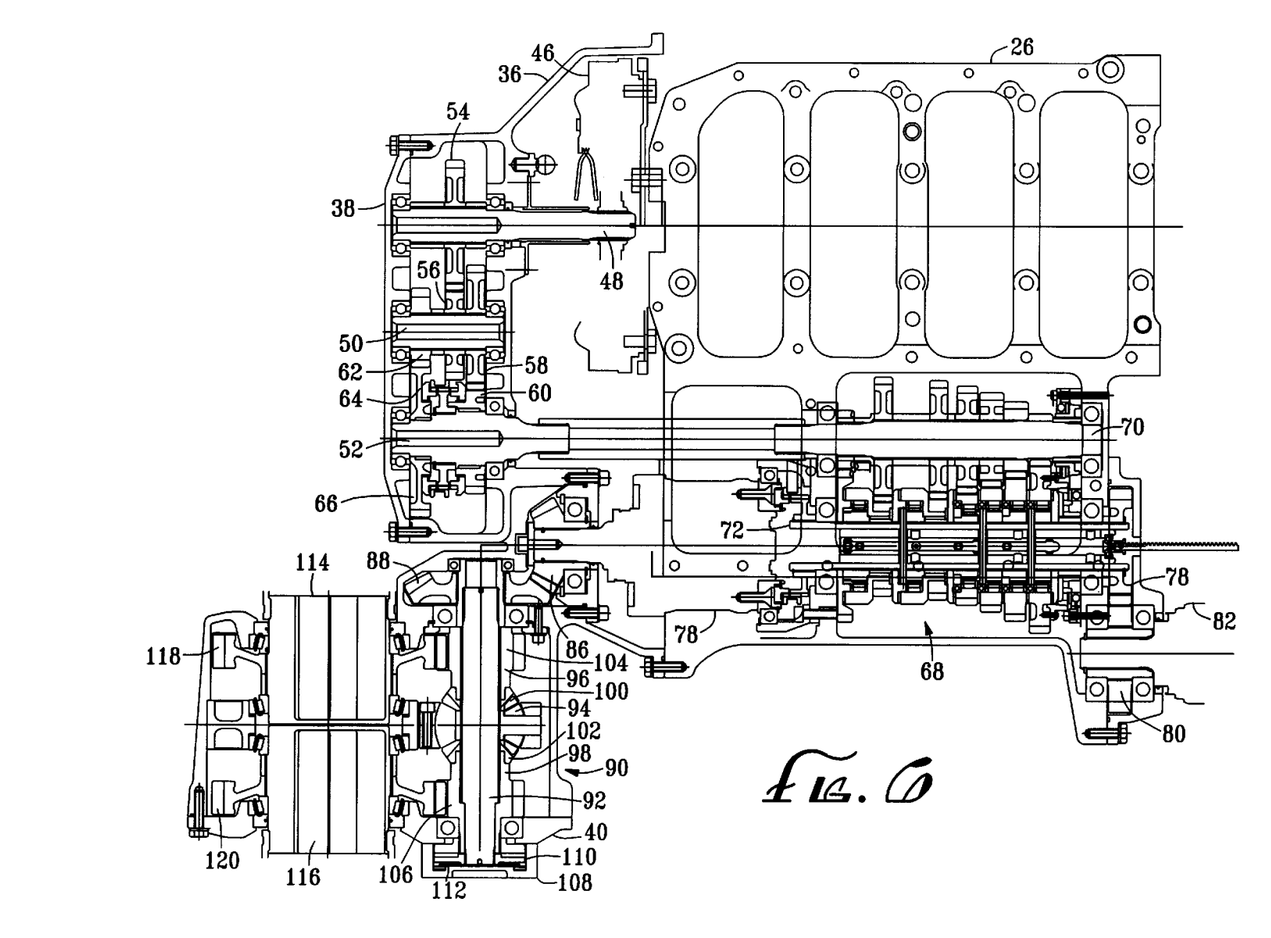
FIG. 6 is a cross-sectional layout of the device of FIG. 2.
Figure 7:
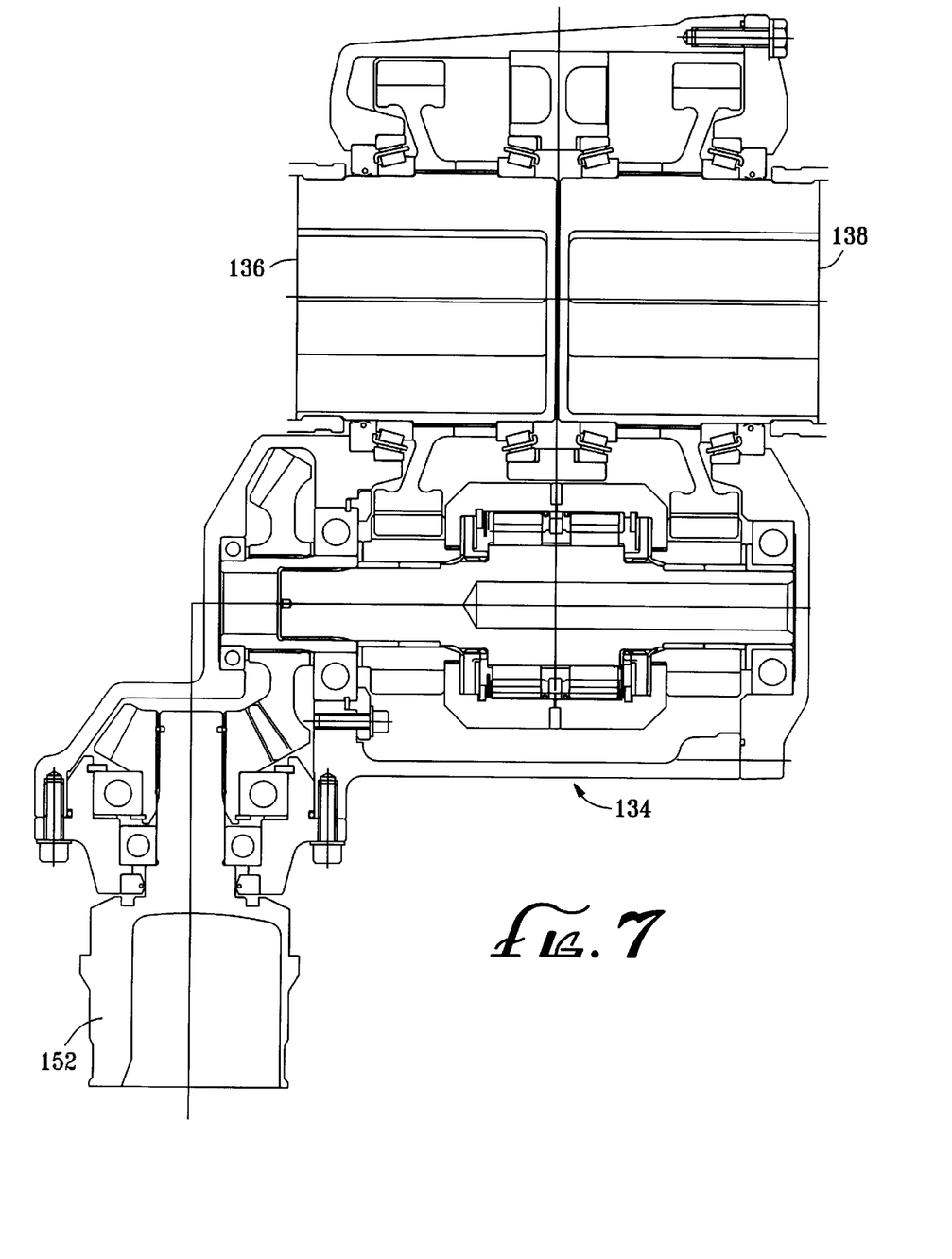
FIG. 7 is a cross-sectional layout of a rear differential as seen in FIG. 1.
Figure 8:
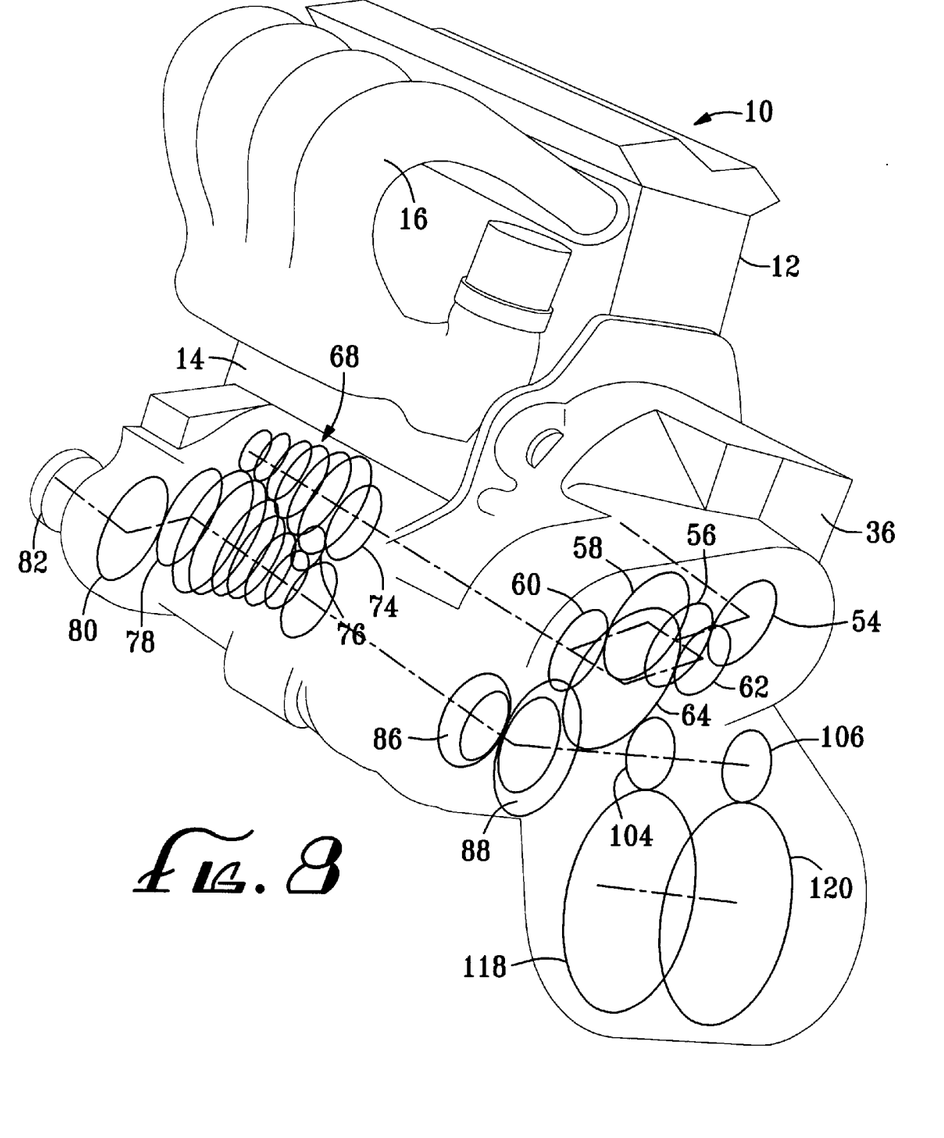
FIG. 8 is a schematic perspective view of the engine illustrating gear location.

Turning in detail to the drawings, A vehicle is shown to include an internal combustion engine 10 with a head 12, a block 14 and an intake manifold 16. A starter 18 is shown to the side of the block 14. At the rear of the engine as positioned in the vehicle of the preferred embodiment, an auxiliary pulley 20 is coupled with the engine crankshaft to drive a belt 22 which in turn drives an alternator 24.

On the lower end of the engine, a sump case 26 is shown to be enlarged to house a transmission as well as the crank area of the engine. An intermediate plate 28 is positioned between the sump case 26 and the block 14. This intermediate plate provides a cover 30 for the transmission and also may be used to provide support for the main bearings of the engine. Engine mounts 32 and 34 are also illustrated.

A drive housing 36 is rigidly attached to the block 14 and sump case 26 on the forward end of the engine. This drive housing 36 is of substantial unitary construction with the addition of structural plates 38 and 40.

The engine crankshaft (not shown) extends from the engine block to mount a flywheel. An electronically controlled clutch 46 is mounted to the flywheel in a conventional manner. A shaft 48 extends outwardly from the clutch assembly coaxial with the crankshaft. The shaft 48 is mounted in bearings to the drive housing 36 and to the structural plate 38. This shaft 48 forms an input shaft for a high/low transmission. A gear shaft 50 is located adjacent to the input shaft 48 and an output shaft 52 is adjacent to the gear shaft 50. The gear shaft 50 and the output shaft 52 are also rotatably mounted in bearings within the drive housing 36 and the structural plate 38.

An input gear set is mounted to the input shaft 48 and the gear shaft 50 and includes spur gear wheels 54 and 56. Each of the gear wheels 54 and 56 are constrained to rotate with the input shaft 48 and the gear shaft 50, respectively. A high gear set and a low gear set are mounted to the gear shaft 50 and output shaft 52. The high gear set includes spur gear wheels 58 and 60 while the spur gear wheels 62 and 64 form the low gear set. The gear wheels 60 and 64 are free to rotate about the output shaft 52. The gear wheels 58 and 62 are fixed to rotate with the gear shaft 50. A shift element 66 is constrained to rotate with the output shaft 52 and is constructed to slidably engage one or the other of the gear wheels 60 and 64. In this way, a conventional two-speed gear transmission is provided which is directly driven by the engine 10 through the clutch 46.

The output shaft 52 extends from the high/low transmission on the same side as the clutch 46. It is shown on the layout to be divided in two pieces which rotate together. It runs adjacent to the engine and parallel to the crankshaft. The output shaft 52 thus extends into the expanded sump case 26 of the engine 10. The transmission 68 is also located in the expanded sump case 26. Six speeds forward are accommodated by gear sets on an input shaft 70 and an output shaft 72. Reverse is also provided through a gear set 74 including a reversing pinion 76 mounted on a separate idler shaft. The transmission contemplated is disclosed in U.S. Pat. Nos. 5,131,285 and 5,301,565, the disclosures of which are incorporated herein by reference.

The placement of the high/low transmission between the engine 10 and the transmission 68 effectively provides twelve speeds forward and two reverse. The location of the high/low transmission reduces torque loading on the device and also allows takeoff from both ends of the transmission output shaft 72. Thus, a separate transfer case after the transmission and before the drive shaft or shafts is avoided. Layout versatility is increased through this arrangement.

The transmission output shaft 72, located in the sump case 26 includes a rear wheel drive output gear set including a gear wheel 78 mounted to the output shaft and a gear wheel 80 rotatably mounted within the sump case 26 and coupled with a constant velocity joint 82 outwardly of the sump case 26. This gear set allows a raising or lowering of the output gear wheel 80 to meet the vehicle configuration. This rear wheel drive gear set is located at the other end of the engine 10 from the clutch 46 and high/low transmission. Thus, the engine 10 is contemplated to be positioned backward from conventional layouts with the output from the crankshaft forwardly in the vehicle.

At the other end of the transmission output shaft 72, a fluid coupling 84 is positioned within the sump case 26. The input to the fluid coupling 84 rotates with the output shaft 72. The coupling may be selectively engaged or disengaged to control selection of two wheel and four wheel drive modes. It also provides the flexibility to allow some disparity in aggregate travel between the front wheels and the back wheels. A bevel gear set includes a bevel gear wheel 86 fixed to the output of the fluid coupling 84 and a bevel gear wheel 88 engaged with the gear wheel 86. The bevel gear wheel 88 provides input to a front wheel differential 90 and is splined to a differential shaft 92 rotatably mounted within the drive housing 36.

The front wheel differential 90 includes differential cross shafts mounting pinion gears 94 which engage two rotatably mounted sleeves 96 and 98 through bevel gears 100 and 102, respectively. The sleeves 96 and 98 are rotatably mounted about the differential shaft 92. About each sleeve 96 and 98 is a spur gear wheel 104 and 106, respectively. Through this arrangement, a differential gear output is provided through the two gear wheels 104 and 106. The front wheel differential 90 is provided with limited slip capabilities by the friction plate assembly 108 located at one end of the differential. The friction plate assembly engages both the differential shaft 92 and the sleeve 98 through a friction plate 110 preloaded by a compression spring 112. Other limited slip mechanisms such as an electronically controlled clutch, a viscus coupler or the like may be employed.

Two constant velocity joints 114 and 116 are mounted coaxially and back to back in the drive housing 36 with the structural plate 40. The constant velocity joints 114 and 116 are rotatably mounted and include gear wheels 118 and 120 which engage the spur gear wheels 104 and 106, respectively, providing differential output. The constant velocity joints are positioned with the axis of rotation of these joints being lower than the differential rotational axis through the differential shaft 92. The constant velocity joints can be so located in this preferred embodiment or raised upwardly where competing vehicle design criteria makes such an arrangement advantageous. By maintaining the axis of rotation of the constant velocity joints 114 and 116 well down below the differential rotational axis, the lower A-arm 122 of the front suspension may be located under the engine/drive train. The location of the constant velocity joints also allows the front axle 124 on each side of the differential to be as long as possible in extending to the wheel hub 126.

Coupled with the constant velocity joint 82 and extending rearwardly on the vehicle is a drive shaft 128. The drive shaft 128 is able to extend from a flat fire wall 130 and remain very close to the upper surface of the floor 132. As the floor of the vehicle must provide some structural rigidity through either a chassis or a unitary structure, the shaft 128 is kept above the bottom of the vehicle body for maximum ground clearance and yet does not require a tunnel raised above the floor in the vehicle interior.

A rear wheel differential 134 is mounted to the vehicle body. The differential may be conventional or may use clutch mechanisms such as the differential of one of U.S. Pat. Nos. 2,865,228 and 3,283,611, the disclosures of which are incorporated herein by reference. Back to back constant velocity joints 136 and 138 maximize half shaft length. A drop-down arrangement to the constant velocity joints 136 and 138 is also employed with this rear differential 134. As with the front differential 90, the rear differential includes driving spur gears 140 and 142 running from each of two sleeves 144 and 146. Driven spur gears 148 and 150 are positioned around the constant velocity joints 136 and 138 to differentially drive these joints. The differential 134 receives power through the drive shaft 128 through another constant velocity joint 152.

The foregoing preferred embodiment contemplates a four wheel drive vehicle advantageously exhibiting high ground clearance. The device also is able to provide a flat fire wall and no tunnel while maintaining high ground clearance for all drive train components. The drive train is also compact and located in a minimum number of structural assemblies with a minimum number of components.

The same concepts can be applied to a mid-engine vehicle by employing the front differential as described above as the rear differential of the mid-engine vehicle. Various gear sets can be rotated to lower the engine relative to the constant velocity joints directing power from the unit. This would be advantageous where ground clearance may be at a minimum but overall vehicle profile is to be kept low.

Accordingly, a unique, compact and versatile drive train is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A drive train comprising
    an engine including a crankshaft;
    a transmission including an output shaft;
    a two speed transmission having a high speed and a low speed said two speed transmission driven by the engine and driving the transmission;
    a first drive coupler at a first end of the output shaft;
    a second drive coupler at a second end of the output shaft.

2. The drive train of claim 1, the engine further including a sump case, the transmission being in the sump case.

3. The drive train of claim 1, the transmission further including an input shaft, the input shaft and the output shaft being parallel to and adjacent the crankshaft.

4. The drive train of claim 3, the two speed transmission including a first shaft coaxial with the crankshaft, a second shaft coaxial with the input shaft and an idler shaft between the first shaft and the second shaft, the crankshaft and the input shaft being on the same side of the two speed transmission.

5. The drive train of claim 1 further comprising a fluid coupling driven by the first drive coupler.

6. The drive train of claim 5, the first drive coupler extending from the end of the transmission adjacent the two speed transmission.

7. The drive train of claim 1 further comprising a differential driven by the output shaft through the first drive coupler.

8. The drive train of claim 7, the differential including a rotational axis transverse to the output shaft of the transmission.

9. The drive train of claim 7, the differential including two differentially coupled drive gear wheels, two adjacent constant velocity joints rotatably mounted to the differential and including two driven gear wheels engaged with the two drive gear wheels, respectively.

10. The drive train of claim 9, the constant velocity joints further including a common axis of rotation and the differential further including a rotational axis, the common axis of rotation of the constant velocity joints being lower than the differential rotational axis.

11. The drive train of claim 1 further comprising
    a drive shaft driven by the second drive coupler;
    a differential driven by the drive shaft.

12. The drive train of claim 1, the second drive coupler including a drive attachment and a gear pair, the gear pair being driven by the output shaft and driving the drive attachment.

13. The drive train of claim 1 further comprising
    a clutch driven by the crankshaft and driving the two speed transmission.

14. A drive train comprising
    a differential including a rotational axis, two differentially coupled drive gear wheels, two adjacent constant velocity joints rotatably mounted to the differential and including two driven gear wheels engaged with the two drive gear wheels, respectively; the constant velocity joints further including a common axis of rotation and the differential further including a rotational axis, the common axis of rotation of the constant velocity joints being lower than the differential rotational axis.

15. A drive train comprising
    an engine including a crankshaft;
    a transmission driven by the engine and including an output shaft and an input shaft, the input shaft and the output shaft being parallel to and adjacent the crankshaft;
    a first drive coupler at a first end of the output shaft;
    a second drive coupler at a second end of the output shaft;
    a fluid coupling driven by the first drive coupler;
    a first differential driven by the fluid coupling;
    a second differential driven by the second drive coupler.

16. The drive train of claim 15 further comprising
    a drive shaft coupled to the second drive coupler, the second differential being coupled to the drive shaft.

17. The drive train of claim 15, the engine further including a sump case, the transmission being in the sump case.

18. The drive train of claim 17, the first differential and the second differential including rotational axes transverse to the output shaft of the transmission.

19. A drive train for a four wheel drive vehicle, comprising
    an engine including a crankshaft;
    a transmission including an input shaft and an output shaft, the input shaft and the output shaft being parallel to and adjacent the crankshaft;
    a two speed transmission having a high speed and a low speed said two speed transmission driven by the engine and driving the transmission;
    a first drive coupler at a first end of the output shaft;
    a second drive coupler at a second end of the output shaft;
    a fluid coupling driven by the first drive coupler;
    a drive shaft driven by the second drive coupler.

20. The drive train of claim 19 further comprising
    a first differential driven by the first drive coupler and including a rotational axis transverse to the output shaft of the transmission, two differentially coupled drive gear wheels, two adjacent constant velocity joints rotatably mounted to the differential with two driven gear wheels engaged with the two drive gear wheels, respectively, the axis of rotation of the constant velocity joints being lower than the differential rotational axis;
    a second differential driven by the drive shaft.

21. The drive train of claim 19, the second drive coupler including a drive attachment and a gear pair, the gear pair being driven by the output shaft and driving the drive attachment.

22. A drive train for a four wheel drive vehicle, comprising
    an engine including a crankshaft;
    a transmission including an input shaft and an output shaft, the input shaft and the output shaft being parallel to and adjacent the crankshaft;

a two speed transmission having a high speed and a low speed said two speed transmission driven by the engine and driving the transmission;

a first drive coupler at a first end of the output shaft;

a second drive coupler at a second end of the output shaft and including a drive attachment and a gear pair, the gear pair being driven by the output shaft and driving the drive attachment;

a fluid coupling driven by the first drive coupler;

a drive shaft driven by the second drive coupler;

a first differential driven by the first drive coupler and including a rotational axis transverse to the output shaft of the transmission, two differentially coupled drive gear wheels, two adjacent constant velocity joints rotatably mounted to the differential with two driven gear wheels engaged with the two drive gear wheels, respectively, the axis of rotation of the constant velocity joints being lower than the differential rotational axis;

a second differential driven by the drive shaft.

23. The drive train of claim 22, the engine further including a sump case, the transmission being in the sump case.

24. The drive train of claim 22, the two speed transmission including a first shaft coaxial with the crankshaft, a second shaft coaxial with the input shaft and an idler shaft between the first shaft and the second shaft, the crankshaft and the input shaft being on the same side of the two speed transmission.

25. A drive train comprising an engine including a crankshaft, an engine block and a sump;

a transmission driven by the engine and including an output shaft and an input shaft, the input shaft and the output shaft being parallel to and adjacent the crankshaft and in the sump;

a drive housing coupled with the engine block and the sump;

a two speed transmission having a high speed and a low speed said two speed transmission in the drive housing and driven by the engine and driving the transmission;

a first drive coupler rotatably mounted relative to the sump at a first end of the output shaft;

a second drive coupler rotatably mounted relative to the sump at a second end of the output shaft;

a fluid coupling in the sump and driven by the first drive coupler;

a first differential in the drive housing and driven by the fluid coupling.

26. The drive train of claim 25 further comprising a clutch in the drive housing and driven by the engine and driving the two speed transmission.

* * * * *